US010496043B2

(12) United States Patent
Kent et al.

(10) Patent No.: US 10,496,043 B2
(45) Date of Patent: Dec. 3, 2019

(54) PRESSURE SENSOR OCCLUSION MITIGATION SYSTEMS AND METHODS

(71) Applicant: Apple Inc., Cupertino, CA (US)

(72) Inventors: Ryan P. Kent, San Mateo, CA (US); Alexander Singh Alvarado, Sunnyvale, CA (US); Jonathan M. Beard, San Jose, CA (US); Stephen P. Jackson, San Francisco, CA (US); Vinay R. Majjigi, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 207 days.

(21) Appl. No.: 15/700,048

(22) Filed: Sep. 8, 2017

(65) Prior Publication Data

US 2019/0079464 A1    Mar. 14, 2019

(51) Int. Cl.
*G04G 21/02* (2010.01)
*G01L 19/02* (2006.01)
*G01L 27/00* (2006.01)
*G04B 47/06* (2006.01)
*G01P 15/08* (2006.01)

(52) U.S. Cl.
CPC ............ *G04G 21/02* (2013.01); *G01L 27/007* (2013.01); *G04B 47/066* (2013.01); *G01P 15/0802* (2013.01)

(58) Field of Classification Search
CPC ......... G01L 19/00; G01L 19/02; G01L 27/00; G01L 27/007; G01P 15/0802; G04B 47/066; G04G 21/02; G04G 21/06
See application file for complete search history.

(56) References Cited

U.S. PATENT DOCUMENTS

| 7,747,383 B2 * | 6/2010 | Ohkubo | G01P 7/00 701/469 |
| 2014/0150530 A1 * | 6/2014 | Ten Kate | G01C 5/06 73/37 |
| 2015/0025817 A1 * | 1/2015 | Ten Kate | A61B 5/1117 702/50 |
| 2017/0067790 A1 * | 3/2017 | Takeuchi | G01L 9/0052 |

\* cited by examiner

*Primary Examiner* — Nguyen Q. Ha
(74) *Attorney, Agent, or Firm* — Morgan, Lewis & Bockius LLP

(57) ABSTRACT

Aspects of the subject technology relate to electronic devices with pressure sensors. Pressure sensor occlusion may be detected based on a comparison of a variance of pressure data from the pressure sensor with a variance of acceleration data from an accelerometer of the device. If a ratio of the pressure data variance to the acceleration data variance is above a threshold, occlusion may be identified. Data from other sensors in the device or in an external device, or other features of the pressure data, may be used to identify a type of occlusion.

26 Claims, 6 Drawing Sheets

PRESSURE SENSOR OCCLUSION MITIGATION SYSTEMS AND METHODS

TECHNICAL FIELD

The present description relates generally to portable electronic devices, and more particularly, but not exclusively, to portable electronic devices with pressure sensors.

BACKGROUND

Electronic pressure sensors are often used to obtain barometric pressure measurements for elevation and/or weather measurements. However, challenges can arise when attempting to implement an electronic pressure sensor in a portable electronic device.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
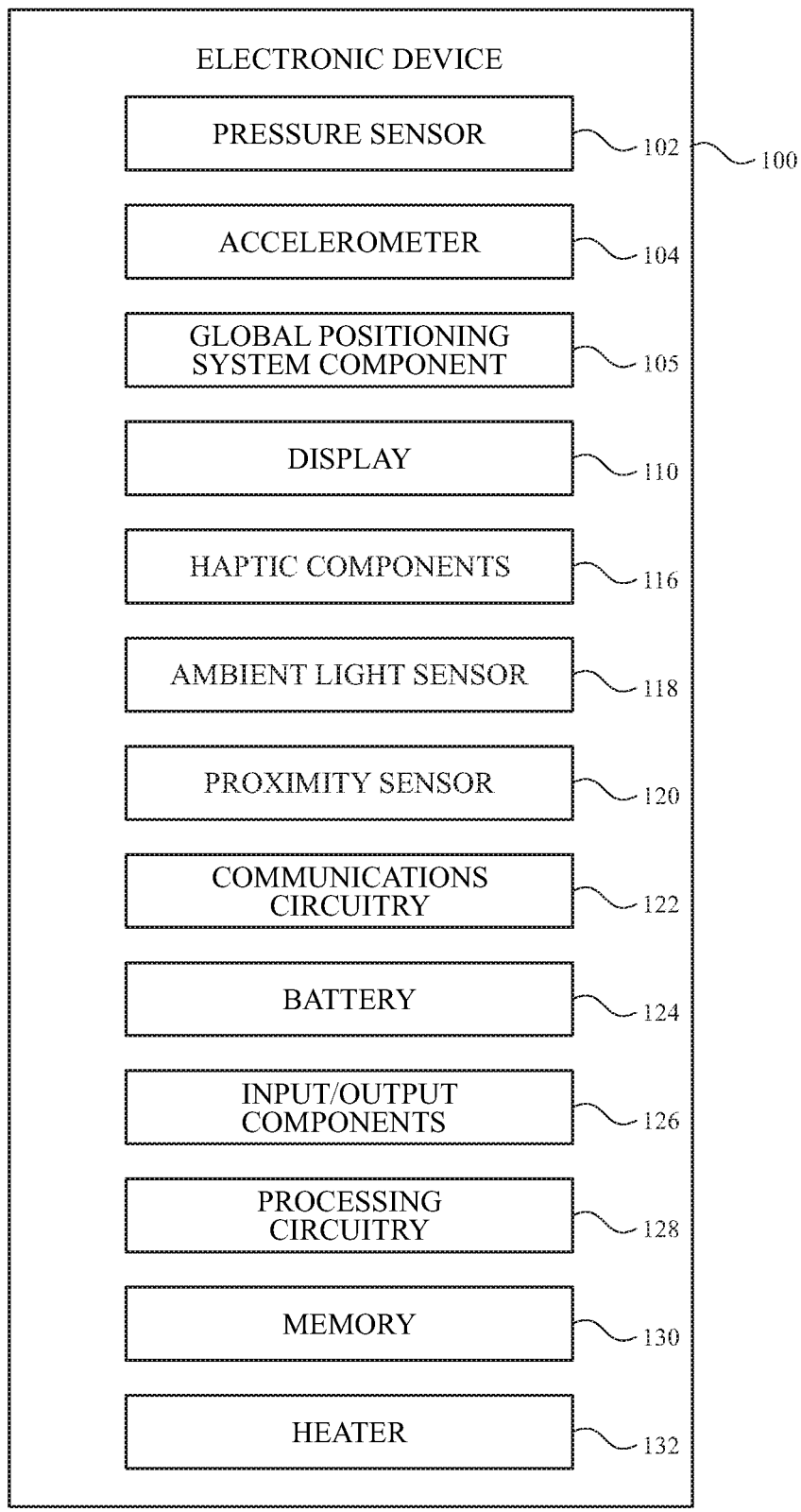
FIG. 1 illustrates a schematic diagram of an electronic device having a pressure sensor in accordance with various aspects of the subject technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Portable electronic devices such as a mobile phones, portable music players, smart watches, and tablet computers are provided that include a pressure sensor for sensing environmental pressure. The pressure sensor is sometimes used for barometric pressure measurements, which can be used to identify changes in elevation. The changes in elevation are sometimes used to identify a location or exercise performed by a user of the device (e.g., by an activity monitor application running on processing circuitry of the device when the device is worn or carried by the user while the user walks or runs up a flight of stairs or up a hill).

Pressure sensors are disposed within the housing of the device and are able to sense the environmental pressure outside the housing due to airflow from outside the housing into the housing at various openings or ports. However, the opening, and/or an internal volume of the port within which the pressure sensor is disposed, can become occluded by environmental aggressors such as a liquid, a portion of a user's skin, or a piece of clothing at or near the port, all of which can alter the performance of the sensor.

Performance of an occluded pressure sensor can be particularly degraded for water-resistant pressure sensors occluded by a liquid. This is because the liquid can couple to a waterproofing gel that covers liquid-sensitive components of the pressure sensor which can cause motion, compression, and/or expansion of the gel that are unrelated to pressure changes, but which can cause changes in the pressure sensor data. For example, surface tension of an occluding liquid in a barometric port for a pressure sensor can cause the liquid to be pulled out of the port, the liquid in turn pulling on the waterproofing gel to cause pressure sensor measurement changes that are unrelated to actual changes in barometric pressure.

However, it has been discovered that accelerations of a device with an occluded pressure sensor and/or pressure sensor port are also coupled to the waterproofing gel, and thus to the pressure sensor measurements, by an occluding aggressor such as an occluding liquid.

In accordance with various aspects of the subject disclosure, a portable electronic device is provided that includes a pressure sensor and an accelerometer. Processing circuitry in the device identifies occlusions of the pressure sensor based on a combination of pressure sensor data from the pressure sensor and acceleration data from the accelerometer, as described in further detail hereinafter.

A schematic block diagram of an illustrative electronic device with a pressure sensor is shown in FIG. 1. In the example of FIG. 1, device 100 includes pressure sensor 102 and accelerometer 104. Pressure sensor 102 includes a pressure sensing element (e.g., a MEMS element, a piezo element, a membrane coupled to a capacitive or resistive transducer circuit, etc.) and may include processing circuitry for the pressure sensor. Accelerometer 104 includes electronic components that generate an acceleration signal responsive to physical accelerations of the accelerometer (e.g., due to acceleration of device 100).

Device 100 also includes processing circuitry 128 and memory 130. Memory 130 may include one or more different types of storage such as hard disk drive storage, nonvolatile memory (e.g., flash memory or other electrically-programmable-read-only memory), volatile memory (e.g., static or dynamic random-access-memory), magnetic or optical storage, permanent or removable storage and/or other non-transitory storage media configure to store static data, dynamic data, and/or computer readable instructions for processing circuitry 128. Processing circuitry 128 may be used in controlling the operation of device 100. Processing circuitry 128 may sometimes be referred to as system circuitry or a system-on-chip (SOC) for device 100.

Processing circuitry 128 may include a processor such as a microprocessor and other suitable integrated circuits, multi-core processors, one or more application specific integrated circuits (ASICs) or field programmable gate arrays (FPGAs) that execute sequences of instructions or code, as examples. In one suitable arrangement, processing circuitry 128 may be used to run software for device 100, such as activity monitoring applications, pressure sensing applications, acceleration sensing application, occlusion detection applications using pressure data and accelerometer data, internet browsing applications, email applications, media playback applications, operating system functions, software for capturing and processing images, software implementing functions associated with gathering and processing sensor data, software that controls audio, visual, and/or haptic functions.

In the example of FIG. 1, device 100 also includes display 110, communications circuitry 122, battery 124, and input/output components 126. Input/output components 126 may include a touch-sensitive layer of display 110, a keyboard, a touch-pad, and/or one or more real or virtual buttons. Input/output components 126 may also include audio components such as one or more speakers and/or one or more microphones. In some scenarios a speaker membrane or a microphone membrane can be operated to move air to affect and/or clear occlusions of one or more ports in a housing of device 100. One or more heaters such as heater 132 (e.g., resistive heating elements or other heating elements) may be provided in device 100. Heater 132 may be operated by processing circuitry 128 to help clear a liquid occlusion by encouraging evaporation of the occluding liquid by raising the temperature the liquid.

Communications circuitry 122 may be implemented using WiFi, near field communications (NFC), Bluetooth®, radio, microwave, and/or other wireless and/or wired communications circuitry. Communications circuitry 122 may be operated by processing circuitry 128 based on instructions stored in memory 130 to perform cellular telephone, network data, or other communications operations for device 100. Communications circuitry 122 may include WiFi and/or NFC communications circuitry operable to communicate with an external device such a mobile telephone or other remote computing device. In some scenarios, data communications with an external device such as communications by circuitry 122 of a smart watch with a host mobile phone may allow the use of data from the external device, in combination with pressure sensor data and/or acceleration data from the watch to identify and/or characterize a pressure sensor occlusion.

As shown in FIG. 1, device 100 may include other components such as a global positioning system (GPS) component 105, haptic components 116 (e.g., one or more vibratory or other actuable devices that can produce tactile responses for a user and/or other desired accelerations of device 100), and/or other sensors such as ambient light sensor 118 and/or proximity sensor 120.

In some scenarios, GPS data (e.g., elevation data) from GPS component 105, ambient light data from ambient light sensor 118, and/or proximity sensor data from proximity sensor 120 may be used, in combination with pressure data from pressure sensor 102 and acceleration data from accelerometer 104 to identify an occlusion of pressure sensor 102 and/or identify an occluding aggressor. For example, ambient light data and/or proximity sensor data may be used, after a pressure sensor occlusion is detected using both pressure data and accelerometer data, to determine whether the pressure sensor port is covered by an opaque object such as a long-sleeved clothing item or a user's own skin.

Figure 2:
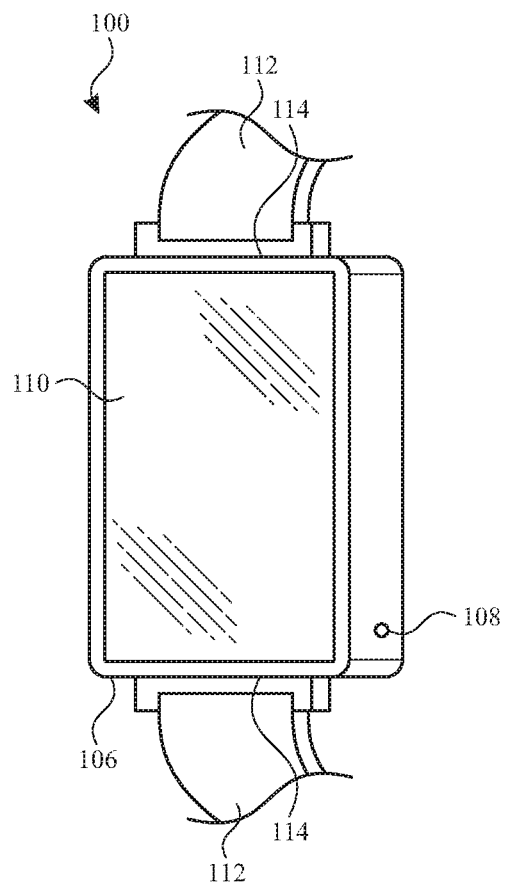
FIG. 2 illustrates a perspective view of an example electronic device implemented as a wearable device in accordance with various aspects of the subject technology.

FIG. 2 is a perspective view of electronic device 100 in a configuration in which electronic device 100 has been implemented in the form of a wearable device such as smart watch. As shown in FIG. 2, display 110 may be mounted on a front surface of housing 106. Housing 106 may include one or more openings such as opening 108. In the example of FIG. 2 opening 108 is formed in a sidewall of housing 106 and provides a fluid coupling for airflow between an environment external to housing 106 into a portion of housing 106. Pressure sensor 102 may be mounted internal to housing 106 adjacent to opening 108 to receive airflow from the external environment through opening 108.

Any or all of components 104, 104, 105, 116, 118, 120, 124, 126, 128, and 130 of FIG. 1 may be mounted on or within housing 106. One or more additional openings in housing 106 may be provided for a speaker, a microphone, an ambient light sensor, and/or a proximity sensor. Strap 112 may be coupled to housing 106 at interfaces 114 and arranged to secure device 100 to a part of a user's body such as around the user's wrist.

Figure 3:
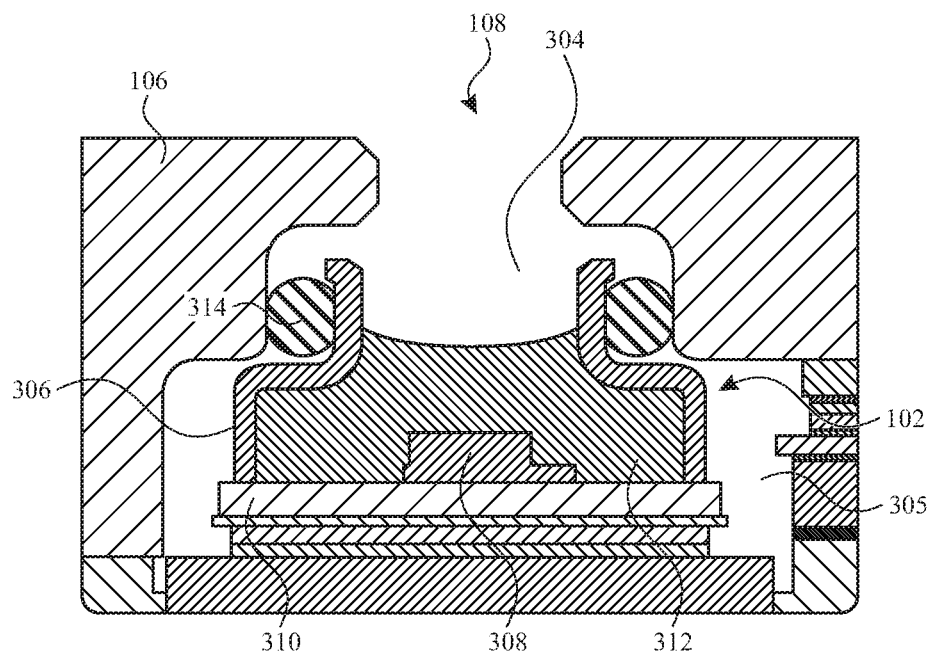
FIG. 3 illustrates a cross-sectional side view of a pressure sensor mounted in a pressure sensor port in a housing of an electronic device in accordance with various aspects of the subject technology.

FIG. 3 shows a cross-sectional side view of a portion of device 100 at the location of opening 108. As shown in FIG. 3, pressure sensor 102 is mounted within housing 106 adjacent opening 108 in housing 106 such that pressure sensor 102 receives airflow through opening 108. A pressure sensor port for pressure sensor 102 is formed by opening 108 and a cavity 304, within housing 106 and adjacent opening 108, within which pressure sensor 102 is disposed.

In the example of FIG. 3, an internal portion 305 of cavity 304 is sealed from liquid ingress by a sealing member 314. Sealing member 314 may be an elastomeric sealing ring that is compressed between a portion of a pressure sensor housing 306 for pressure sensor 102 and an interfacing portion of housing 106. In this way, pressure sensor 102 may be provided with access to the airflow from the external environment through 108, while liquid is prevented from proceeding into housing 106 beyond sealing member 314. However, liquid (e.g., water, oil, soap, etc.) and/or other environmental aggressors such as dust or dirt may enter cavity 304 and occlude sensor 102 and/or the port formed by opening 108 and cavity 304 from receiving unobstructed airflow for environmental pressure sensing.

In the example of FIG. 3, pressure sensor 102 is a water-resistant pressure sensor having a waterproofing encapsulation 312 such as a waterproofing gel disposed over pressure sensing element 308 and pressure sensor electronics 310 to prevent liquid from contacting the pressure sensing element and/or the pressure sensor electronics. However, liquid that enters cavity 304 can adhere to waterproofing encapsulation 312 and can negatively affect the pressure measurements made using pressure sensing element 308.

Figure 4:
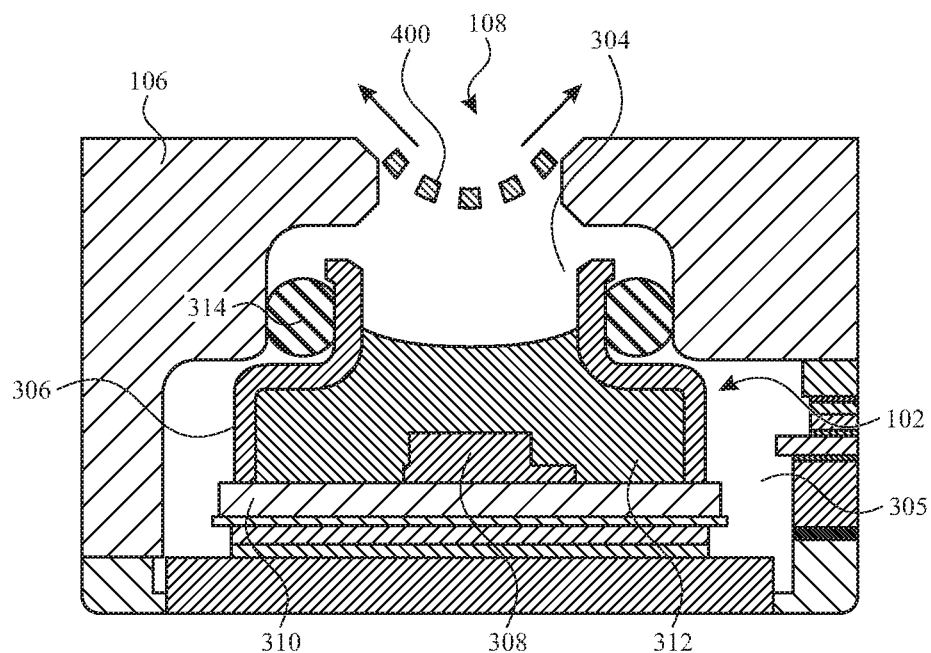
FIG. 4 illustrates the cross-sectional side view of the pressure sensor of FIG. 3 with a liquid occlusion in accordance with various aspects of the subject technology.

FIG. 4 shows an example of the cross-sectional side view of a portion of device 100 at the location of opening 108, in a scenario in which liquid 400 has entered and partially filled cavity 304. The occluding liquid 400 can cause pressure changes or variations at pressure sensing element 308. For example, as indicated by the arrows in FIG. 4, surface tension of occluding liquid 400 in cavity 304 can cause liquid 400 to be pulled outward (e.g., toward the external environment side of opening 108), thereby generating a reduction in pressure in cavity 304.

This reduction in pressure can, if the occlusion by liquid 400 is not detected, be falsely identified as a change in elevation of device 100. However, as noted herein, it has been discovered that, when device 100 is accelerated, pressure variations due to resulting motion of the liquid increase in a way that is indicative of an occlusion. By combining the pressure sensor data from pressure sensor 102 with accelerometer data from accelerometer 104 (e.g., with which accelerations of device 100 are detected and quantified), the variance of the pressure sensor data can be used to identify pressure sensor occlusions and thus prevent false identifications of elevation changes.

For example, an occlusion may be detected when a variance of the pressure sensor data, within a time window, is greater than a threshold that is dependent on the variance of the accelerometer data. For example, for one or more measurements of the variance of the accelerometer data within the time window, processing circuitry such as processing circuitry 128 of FIG. 1 and/or processing circuitry 310 of sensor 102 itself determines whether a corresponding variance of the pressure sensor data (i.e., a variance of pressure sensor data that was obtained at the same time as the accelerometer data) is greater than a threshold based on that measured accelerometer data variance. The threshold at each accelerometer variance may be determined by applying an empirically determined multiplicative factor to the accelerometer variance and/or adding an empirically determined offset to the result. Occlusion may be detected when a single variance measurement is greater than the threshold or when a set or group of variance measurements is greater than the threshold.

In order to enhance the occlusion detection, particularly for activity monitor applications, the accelerometer data and/or the pressure data may be filtered to remove signal variations outside of a desired frequency range. For example, the accelerometer data and/or the pressure data may be filtered to exclude signal variations with frequencies outside of the typical human arm swing frequencies when walking and running (e.g., outside of the frequency range of a slow walk arm swing frequency of about 0.4 Hz to a fast run arm swing frequency of about 4 Hz).

The values (e.g., the multiplicative factor and the offset) that set the accelerometer-data-based threshold for the device are determined by determining the ratio of the pressure variance and the accelerometer variance across walk/run datasets during a time when the device (or a similar device) is known to be dry (i.e., when there is no liquid occlusion of the pressure sensor).

In some scenarios, a speaker of input/output components 126, haptic components 116, or another actuable component in the device are operated to induce device accelerations for occlusion measurements. In some scenarios, the processing circuitry distinguishes different amounts and/or different types of occluders (e.g., liquid vs. skin vs. clothing occluders) using features of the pressure data other than the variance, in combination with the accelerometer data. For example, changes in the variance of the pressure data at a constant accelerometer variance can indicate a liquid occlusion that is evaporating. As another example, the peak-to-peak amplitude of the raw pressure signal may be used to distinguish between a liquid occluder, a clothing occluder, or a skin occluder.

In some scenarios, data from other components in the device such as a proximity sensor, an ambient light sensor, and/or a global positioning system component is combined with the pressure sensor data and the accelerometer data to distinguish the type of occluder. In some scenarios, the processing circuitry receives external data from, for example, a mobile phone and uses the external data to determine which pressure sensor data and accelerometer data to use for occlusion detection, to determine a time period for occlusion detection, to help identify occlusion, and/or to help identify a type of occluder. For example, if occlusion is detected by a smart watch, the smart watch may request GPS elevation data from a communicatively coupled mobile phone to determine whether pressure sensor data obtained while the pressure sensor was occluded can be used for elevation measurements (e.g., if the elevation measurements from the pressure sensor agree with the GPS elevation data).

Upon determination that the pressure sensor and/or the port formed by opening 108 and cavity 304 are occluded, processing circuitry 128 takes corrective action. The corrective action may include providing a notification to a user of device 100 that the pressure sensor is occluded, providing instructions to the user to clear the occlusion (e.g., by shaking the device or using a drying instrument in the port), preventing pressure sensor data obtained while the sensor was occluded from being used in other applications (e.g., to identify elevation changes and/or resulting exercise minutes), providing an occlusion notice to other components and/or applications of the device (e.g., to a speaker component to indicate the need to increase speaker volume), and/or operating an additional component within the housing (e.g., a speaker, a haptic component, a heater, or another actuable component) to clear the occlusion.

Figure 5:
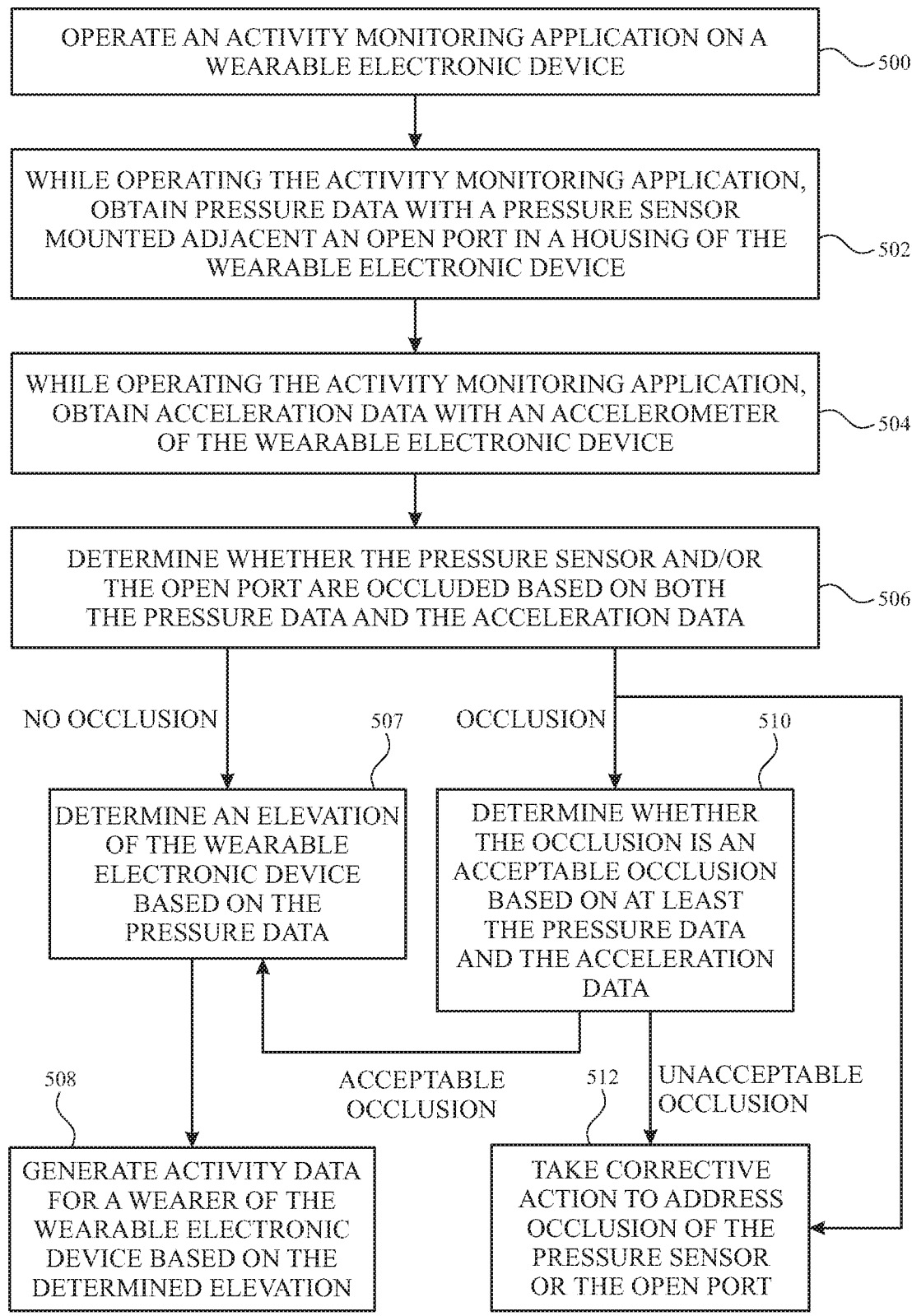
FIG. 5 illustrates a flow chart of an example process for operation of an electronic device with a pressure sensor and an accelerometer in accordance with various aspects of the subject technology.

FIG. 5 depicts a flow diagram of an example process for operation of device 100, in accordance with various aspects of the subject technology. For explanatory purposes, the example process of FIG. 5 is described herein with reference to the components of FIGS. 1-4. Further for explanatory purposes, some blocks of the example process of FIG. 5 are described herein as occurring in series, or linearly. However, multiple blocks of the example process of FIG. 5 may occur in parallel. In addition, the blocks of the example process of FIG. 5 need not be performed in the order shown and/or one or more of the blocks of the example process of FIG. 5 need not be performed.

In the depicted example flow diagram, at block 500, an activity monitoring application of a wearable electronic device such as smart watch 100 of FIG. 2 may be operated. Operating the activity monitoring application may include monitoring an activity of a wearer of a smart watch with the activity monitoring application of the smart watch (e.g., by monitoring the position, motion, elevation, acceleration, and/or position of device 100 using various sensors within the device).

At block 502, while operating the activity monitoring application, pressure data may be obtained with a pressure sensor (e.g., pressure sensor 102) mounted adjacent an open port (e.g., opening 108) in a housing (e.g., housing 106) of the wearable electronic device.

At block 504, while operating the activity monitoring application, acceleration data may be obtained with an accelerometer such as accelerometer 104 of the wearable electronic device.

At block 506, processing circuitry such as processing circuitry 128 and/or sensor processing circuitry 310 determines whether the pressure sensor and/or the open port are occluded based on both the pressure data and the acceleration data (e.g., by analyzing both the pressure data and the acceleration data). For example, occlusion may be detected when a ratio of the variance of the pressure data to the variance of the acceleration data is greater than a threshold and/or when the variance of the pressure data is greater than an accelerometer-variance-based threshold. The accelerometer-variance-based threshold may be a multiplicative factor multiplied by the accelerometer variance plus an additive factor, in one example. The multiplicative factor and the additive factor may be empirically determined based on empirical pressure variance data and accelerometer variance data, in the walk/run frequency range, obtained when the device was dry.

At block 507, if no occlusion is detected, an elevation of the wearable electronic device is determined based on the pressure data (e.g., using the pressure data by converting a barometric pressure measured by the pressure sensor into a device elevation).

At block 508, activity data such as exercise statistics may be generated for a wearer of the wearable electronic device based on the determined elevation. For example, one or more flights of stairs may be awarded to the wearer using a change in elevation determined using the determined elevation.

At block 510, if occlusion is detected, processing circuitry such as processing circuitry 128 and/or sensor processing circuitry 310 may determine whether the occlusion is an acceptable occlusion (at block 510) or may proceed to take corrective action to address occlusion of the pressure sensor or the open port (at block 512) without whether the occlusion is an acceptable occlusion. Correction action can include, as one example, rejecting the pressure sensor data from inclusion in determining exercise statistics for the wearer of device 100.

If the operations of block 510 are performed and if the occlusion is identified as an acceptable occlusion (e.g., an occlusion such as a clothing occlusion that affects the pressure variance but does not negatively affect the absolute pressure measurements), the operations of block 507 can be performed (e.g., with or without accounting for noisy data caused by the acceptable occlusion).

If the operations of block 510 are performed and if the occlusion is identified as an unacceptable occlusion (e.g., an occlusion such as the liquid occlusion of FIG. 4 that affects the pressure variance and also negatively affects the absolute pressure measurements), the operations of block 512 can be performed.

Although the example of FIG. 5 describes the use of pressure sensor data (and associated occlusion detection operations) in the context of determining exercise statistics by an activity monitoring application of a wearable electronic device, it will be appreciated that the occlusion detection operations described herein can be applied to pressure sensors mounted in other devices and used for other applications, some examples of which have been described herein.

Figure 6:
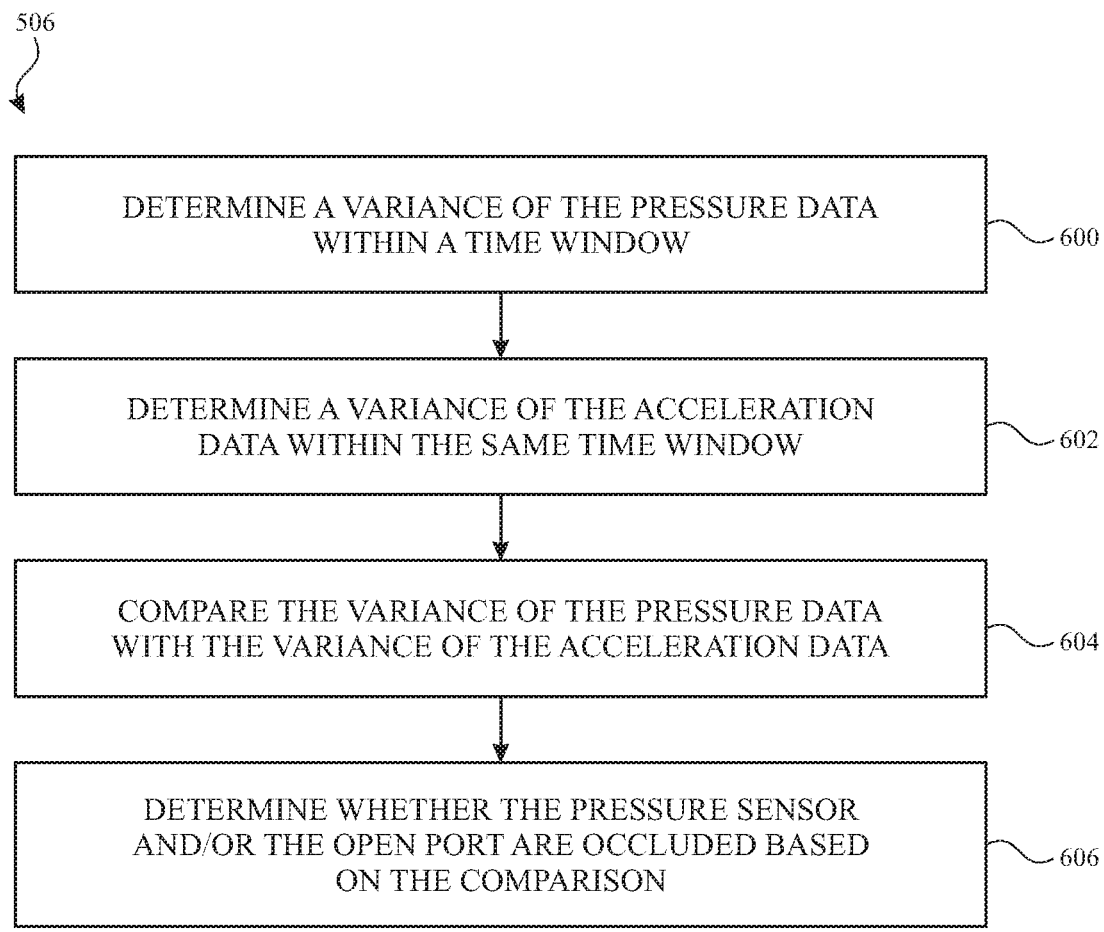
FIG. 6 illustrates a flow chart of an example process for identifying pressure sensor occlusion in accordance with various aspects of the subject technology.

FIG. 6 depicts a flow diagram of an example process for determining whether the pressure sensor and/or the open port are occluded by analyzing both the pressure data and the acceleration data as in block 506 of FIG. 5, in accordance with various aspects of the subject technology. For explanatory purposes, the example process of FIG. 6 is described herein with reference to the components of FIGS. 1-4. Further for explanatory purposes, some blocks of the example process of FIG. 6 are described herein as occurring in series, or linearly. However, multiple blocks of the example process of FIG. 6 may occur in parallel. In addition, the blocks of the example process of FIG. 6 need not be performed in the order shown and/or one or more of the blocks of the example process of FIG. 6 need not be performed.

In the depicted example flow diagram, at block 600, a variance of the pressure data, within a time window, is determined (e.g., by processing circuitry such as processing circuitry 128 and/or sensor processing circuitry 310). Determining the variance of the pressure data may include filtering the pressure data to exclude frequencies outside of the frequency range of, for example, 0.4 Hz to 4 Hz and determining the variance of the filtered data. The time window may be, for example a time window of between 4 seconds and 6 seconds (e.g., 5.12 seconds).

At block 602, a variance of the acceleration data within the same time window is determined (e.g., by processing circuitry such as processing circuitry 128 and/or sensor processing circuitry 310). Determining the variance of the accelerometer data may include filtering the accelerometer data to exclude frequencies outside of the frequency range of, for example, 0.4 Hz to 4 Hz and determining the variance of the filtered data. In this way, passive accelerations of device 100 when a wearer or carrier of the device walks or runs can be used to identify pressure sensor occlusions. However, this is merely illustrative. In other scenarios, haptic components 116 may be used to induce purposeful accelerations to device 100 at a particular desired frequency or by activating a resonant frequency response of the occluder. In these scenarios, the acceleration data and the pressure data may be filtered to emphasize frequencies associated with the induced accelerations.

At block 604, the variance of the pressure data is compared with the variance of the acceleration data (e.g., by processing circuitry such as processing circuitry 128 and/or sensor processing circuitry 310). Comparing the variance of the pressure data with the variance of the acceleration data may include comparing the variance of the pressure data with a threshold that is dependent on the variance of the acceleration data (e.g., an accelerometer-variance-based threshold) as described herein.

At block 606, processing circuitry such as processing circuitry 128 and/or sensor processing circuitry 310 determines whether the pressure sensor and/or the open port are occluded based on the comparison. For example, an occlusion is detected when the variance of the pressure data is greater than the accelerometer-variance-based threshold.

Although variances are sometimes described herein as an example, it should be appreciated that other statistical measures of data fluctuations (e.g., fluctuation amplitudes) can also be used for the pressure data and the acceleration data.

Figure 7:
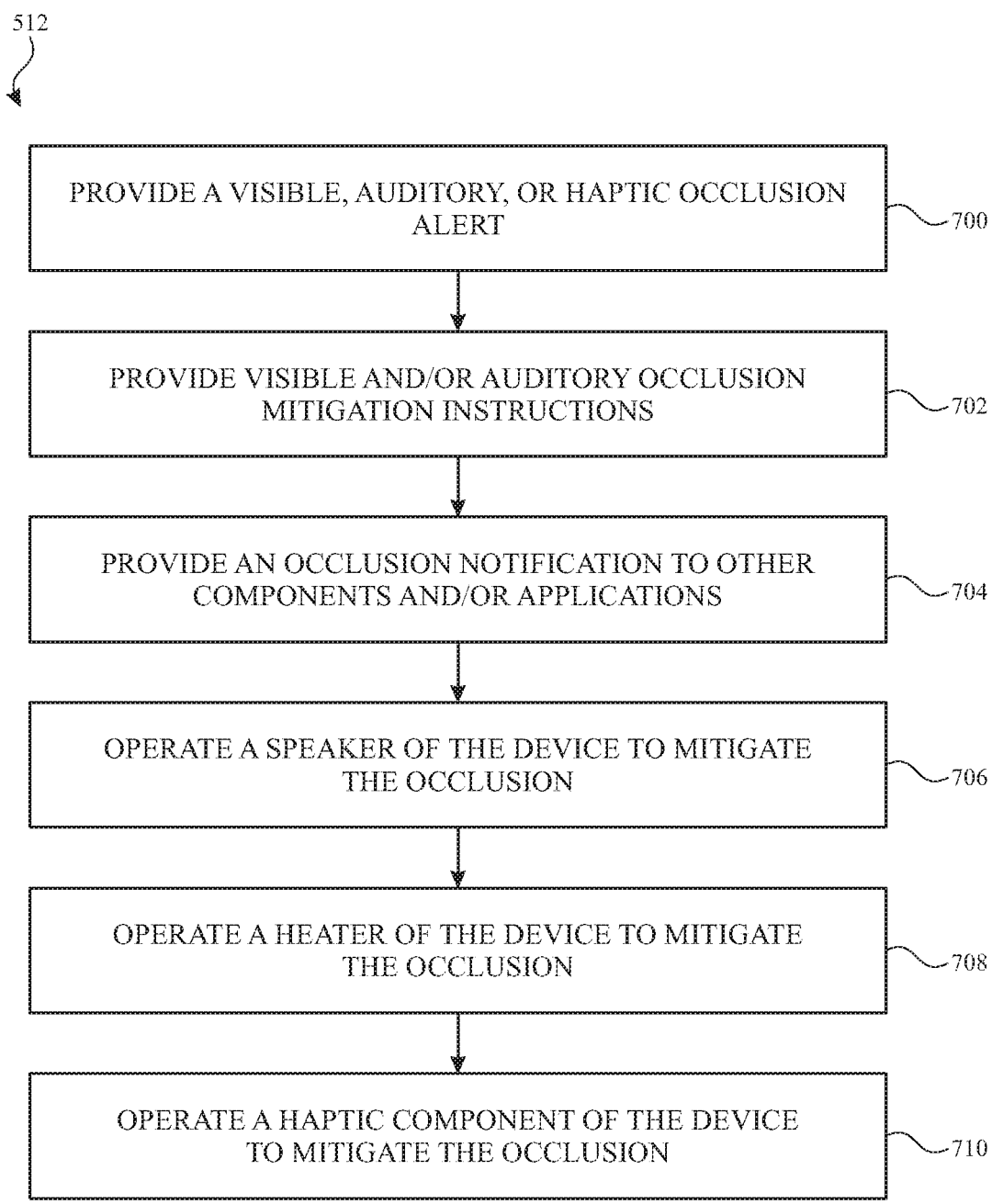
FIG. 7 illustrates a flow chart of an example process for taking corrective action for an identified pressure sensor occlusion in accordance with various aspects of the subject technology.

FIG. 7 depicts a flow diagram of an example process for taking corrective action to address occlusion of the pressure sensor or the open port as in block 512 of FIG. 5, in accordance with various aspects of the subject technology. For explanatory purposes, the example process of FIG. 7 is described herein with reference to the components of FIGS. 1-4. Further for explanatory purposes, some blocks of the example process of FIG. 7 are described herein as occurring in series, or linearly. However, multiple blocks of the example process of FIG. 7 may occur in parallel. In addition, the blocks of the example process of FIG. 7 need not be performed in the order shown and/or one or more of the blocks of the example process of FIG. 7 need not be performed.

In the depicted example flow diagram, at block 700, a visible, auditory, or haptic occlusion alert can be provided (e.g., to a user or wearer of device 100). For example, display 110 may be used to indicate to a user that the pressure sensor and/or the associated port are occluded. As another example, a speaker may be used to generate an auditory alert (e.g., a beeping sound or an automated spoken-word alert) for a user that the pressure sensor and/or the associated port are occluded. As another example, haptic components 116 may be used to generate a tactile alert (e.g., a series of vibrations) that indicate that the pressure sensor and/or the associated port are occluded.

At block 702, visible and/or auditory occlusion mitigation instructions may be provided to the user. For example, displayed text or spoken word auditory instructions may be provided to the user to shake the device to clear the occlusion or to use a drying instrument to clear the occlusion.

At block 704, an occlusion notification to other components and/or applications may be provided. For example, if the pressure sensor port is occluded by a liquid, a speaker port may also be occluded by the liquid. Accordingly, an alert may be provided to the speaker or control circuitry for the speaker to increase the speaker volume to account for sound damping by the occlusion.

At block 706, a speaker of the device may be operated to mitigate the occlusion. For example, a membrane of a speaker at or near the pressure sensor port may be actuated to move air through opening 108 or within cavity 304 to clear the occlusion.

At block 708, a heater of the device such as heater 132 may be operated to mitigate the occlusion. For example, heater 132 may be a heating element disposed in cavity 304 or across opening 108 (as examples). Heater 132 may be operated to generate heat to facilitate evaporation of a liquid occlusion.

At block 710, a haptic component such as haptic components 116 of the device may be operated to mitigate the occlusion. For example, a haptic component at or near the pressure sensor port may be actuated to move or weaken the occluding aggressor.

In accordance with various aspects of the subject disclosure, a smart watch is provided that includes a housing having an opening. The smart watch also includes a pressure sensor mounted within the housing and positioned for fluid coupling of the pressure sensor to an environment external to the housing via the opening. The smart watch also includes an accelerometer disposed within the housing. The smart watch also includes processing circuitry configured to obtain pressure sensor data from the pressure sensor, obtain accelerometer data from the accelerometer, and analyze the pressure sensor data and the accelerometer data to detect an occlusion of the fluid coupling of the pressure sensor to the environment external to the housing.

In accordance with other aspects of the subject disclosure, a method is provided that includes obtaining pressure sensor data from a pressure sensor mounted within a housing of a portable electronic device and positioned for fluid coupling of the pressure sensor to an environment external to the housing via an opening in the housing. The method also includes obtaining accelerometer data from an accelerometer disposed within the housing. The method also includes analyzing the pressure sensor data and the accelerometer data to detect an occlusion of the fluid coupling of the pressure sensor to the environment external to the housing.

In accordance with other aspects of the subject disclosure, a method is provided that includes monitoring an activity of a wearer of a smart watch with an activity monitoring application of the smart watch. The method also includes while monitoring the activity obtaining pressure sensor data from a pressure sensor of the smart watch, obtaining acceleration data from an accelerometer of the smart watch, and using both the pressure sensor data and the acceleration data to identify a change in an elevation of the smart watch.

In accordance with other aspects of the subject disclosure, an electronic device is provided that includes a housing having an opening. The electronic device also includes a pressure sensor mounted in a sensor port adjacent the opening. The electronic device also includes an accelerometer disposed within the housing. The electronic device also includes processing circuitry configured to obtain pressure sensor data from the pressure sensor, obtain accelerometer data from the accelerometer, obtain a variance of the pressure sensor data, obtain a variance of the accelerometer data, and determine whether the sensor port is occluded by comparing the variance of the pressure sensor data and the variance of the accelerometer data Various functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "processor", and "memory" all refer to electronic or other technological devices. These terms exclude people or groups of people. For the purposes of the specification, the terms "display" or "displaying" means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device as described herein for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Some of the blocks may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or design All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A smart watch, comprising:
a housing having an opening;
a pressure sensor mounted within the housing and positioned for fluid coupling of the pressure sensor to an environment external to the housing via the opening;
an accelerometer disposed within the housing; and
processing circuitry configured to:

obtain pressure sensor data from the pressure sensor;
obtain accelerometer data from the accelerometer; and
analyze the pressure sensor data and the accelerometer data to detect an occlusion of the fluid coupling of the pressure sensor to the environment external to the housing.

2. The smart watch of claim 1, wherein the processing circuitry is configured to analyze the pressure sensor data and the accelerometer data to detect the occlusion of the fluid coupling of the pressure sensor to the environment external to the housing by:
obtaining a variance of the pressure sensor data;
obtaining a variance of the accelerometer data; and
analyzing the variance of the pressure sensor data and the variance of the accelerometer data to detect the occlusion.

3. The smart watch of claim 2, wherein the processing circuitry is configured to analyze the variance of the pressure sensor data and the variance of the accelerometer data to detect the occlusion by determining that the variance of the pressure sensor data is greater than an accelerometer-variance-based threshold.

4. The smart watch of claim 3, wherein the processing circuitry is further configured analyze additional features of the pressure sensor data to determine a type of the occlusion.

5. The smart watch of claim 4, wherein the type of the occlusion is a liquid occlusion, a skin occlusion, or a clothing occlusion.

6. The smart watch of claim 5, wherein the type of the occlusion is a liquid occlusion and wherein the processing circuitry is configured to determine an amount of an occluding liquid by identifying a change in the variance of the pressure sensor data.

7. The smart watch of claim 3, wherein the processing circuitry is further configured to use the accelerometer data, the pressure sensor data, and data from an additional sensor to determine a type of the occlusion.

8. The smart watch of claim 7, wherein the additional sensor is a proximity sensor, an ambient light sensor, or a global positioning system sensor disposed in the housing.

9. The smart watch of claim 7, wherein the additional sensor is a sensor in a mobile phone, separate from the smart watch.

10. The smart watch of claim 1, wherein the processing circuitry is further configured to take corrective action when it is determined that the fluid coupling of the pressure sensor to the environment external to the housing is occluded.

11. The smart watch of claim 10, wherein the corrective action comprises generating a user alert related to the occlusion.

12. The smart watch of claim 10, wherein the corrective action comprises operating an additional component within the housing to mitigate the occlusion.

13. The smart watch of claim 10, wherein the processing circuitry is further configured to use the pressure sensor data to determine exercise statistics for a wearer of the smart watch and wherein the corrective action comprises rejecting the pressure sensor data from inclusion in determining the exercise statistics.

14. The smart watch of claim 1, further comprising an actuable component and wherein the processing circuitry is configured to operate the actuable component, while obtaining the pressure sensor data and the accelerometer data, to generate accelerations of the pressure sensor and the accelerometer.

15. The smart watch of claim 14, wherein the actuable component comprises a speaker or a haptic component.

16. A method, comprising:
obtaining pressure sensor data from a pressure sensor mounted within a housing of a portable electronic device and positioned for fluid coupling of the pressure sensor to an environment external to the housing via an opening in the housing;
obtaining accelerometer data from an accelerometer disposed within the housing; and
analyzing the pressure sensor data and the accelerometer data to detect an occlusion of the fluid coupling of the pressure sensor to the environment external to the housing.

17. The method of claim 16, wherein analyzing the pressure sensor data and the accelerometer data to detect the occlusion of the fluid coupling of the pressure sensor to the environment external to the housing includes:
obtaining a variance of the pressure sensor data;
obtaining a variance of the accelerometer data; and
determining whether the variance of the pressure sensor data is greater than a threshold that is determined using the variance of the accelerometer data.

18. The method of claim 17, further comprising using the accelerometer data and additional features of the pressure sensor data to determine a type of the occlusion based on, wherein the type of the occlusion is a liquid occlusion, a skin occlusion, or a clothing occlusion.

19. The method of claim 18, wherein the type of the occlusion is a liquid occlusion and wherein the method further comprises an amount of an occluding liquid by identifying a change in the variance of the pressure sensor data.

20. The method of claim 16, further comprising, with processing circuitry disposed in the housing, taking corrective action when it is determined that the fluid coupling of the pressure sensor to the environment external to the housing is occluded.

21. A method, comprising:
monitoring an activity of a wearer of a smart watch with an activity monitoring application of the smart watch; and
while monitoring the activity:
obtaining pressure sensor data from a pressure sensor of the smart watch;
obtaining acceleration data from an accelerometer of the smart watch; and
using both the pressure sensor data and the acceleration data to identify a change in an elevation of the smart watch, by comparing a variance of the pressure sensor data with a threshold that depends on a variance of the acceleration data.

22. The method of claim 21, further comprising generating activity data for the wearer based on the identified change.

23. The method of claim 21, further comprising determining the threshold by applying a multiplicative factor and an additive factor to the variance of the acceleration data.

24. The method of claim 21, wherein obtaining the pressure sensor data comprises obtaining the pressure sensor data during a time window and wherein obtaining the acceleration data comprises obtaining the acceleration data during the same time window.

25. An electronic device, comprising:
a housing having an opening;
a pressure sensor mounted in a sensor port adjacent the opening;
an accelerometer disposed within the housing; and
processing circuitry configured to:

obtain pressure sensor data from the pressure sensor;
obtain accelerometer data from the accelerometer;
obtain a variance of the pressure sensor data;
obtain a variance of the accelerometer data; and
determine whether the sensor port is occluded by comparing the variance of the pressure sensor data and the variance of the accelerometer data.

26. The electronic device of claim 25, wherein the comparison of the variance of the pressure sensor data and the variance of the accelerometer data comprises an identification of a threshold based on the variance of the accelerometer data and a comparison of the variance of the pressure sensor data with the threshold.

* * * * *